(12) United States Patent
Karamavruc

(10) Patent No.: US 7,513,345 B2
(45) Date of Patent: Apr. 7, 2009

(54) SLIP CLUTCH COOLING CONFIGURATION

(75) Inventor: Aliihsan Karamavruc, Wooster, OH (US)

(73) Assignee: LuK Lamellen und Kupplungsbau Beteiligungs, KG, Bühl (DE)

( * ) Notice: Subject to any disclaimer, the term of this patent is extended or adjusted under 35 U.S.C. 154(b) by 438 days.

(21) Appl. No.: 11/497,495

(22) Filed: Aug. 1, 2006

(65) Prior Publication Data

US 2007/0045074 A1      Mar. 1, 2007

Related U.S. Application Data

(60) Provisional application No. 60/711,231, filed on Aug. 25, 2005.

(51) Int. Cl.
*F16H 45/02* (2006.01)
*F16D 13/72* (2006.01)
(52) U.S. Cl. .............. 192/3.29; 192/70.12; 192/113.36
(58) Field of Classification Search ............. 192/113.36
See application file for complete search history.

(56) References Cited

U.S. PATENT DOCUMENTS 6,742,637 B2    6/2004  Ackermann
6,851,532 B2 *  2/2005  Back et al. ................... 192/3.3

* cited by examiner

*Primary Examiner*—Rodney H Bonck
(74) *Attorney, Agent, or Firm*—Simpson & Simpson, PLLC

(57) ABSTRACT

The present invention is one or more torque converter clutch friction pad attached to a friction plate configured to more easily remove heat generated by the friction of a clutch engaging the friction plate. The invention resides in one or more circular grooves set into the friction surface of the friction pad and connected to a plurality of radial grooves. One or more boats or protrusions functionally attached to the clutch pressure plate and/or the torque converter housing fits into the circular groove. When the clutch is engaged, the boats rotate through the circumferential groove pulling oil from the rear radial groove into the circumferential groove and pushing oil into the forward radial groove. The heat generated in the friction plate is transferred to the oil in the circumferential groove and removed from the friction pad when the rotating boat pushes it into the forward radial groove.

33 Claims, 4 Drawing Sheets

SLIP CLUTCH COOLING CONFIGURATION

CROSS REFERENCE TO RELATED APPLICATIONS

This patent application claims the benefit under 35 U.S.C. §119(e) of U.S. Provisional Application No. 60/711,231, filed Aug. 25, 2005, which application is incorporated herein by reference.

FIELD OF THE INVENTION

The present invention pertains to torque converter clutches, specifically to friction pads for torque converter clutches, and more specifically to a configuration for facilitating the removal of heat from friction pads.

BACKGROUND OF THE INVENTION

The automatic transmission has been a key development in transportation as it eliminates the need for manual shifting to suitable drive gears by the driver. This is especially beneficial in heavy "stop-and-go" traffic which entails frequent shifting of gears to achieve the most efficient forward motion. Rather than frequent shifting by the driver, the automatic transmission performs these changes without the need for driver input.

One problem with automatic transmissions is lower fuel economy relative to manual transmissions. While manual transmissions directly engage the drive gear with the engine through the flywheel, automatic transmissions generate rotation of the transmission drive shaft through a turbine that is rotated by fluid pumped against the turbine vanes. The pumped fluid provides an indirect connection between the engine and the transmission drive shaft. This indirect connection reduces the efficiency of the vehicle drive train with a consequent loss of gas mileage.

A large portion of this "efficiency gap" between manual and automatic transmissions is eliminated by means of a torque converter clutch. At a predetermined parameter, such as a particular engine RPM or transmission fluid pressure, the torque converter clutch engages the engine flywheel. In one embodiment, an electronic solenoid activates to allow the transmission fluid to press against the clutch pressure plate which in turn presses a friction plate against the torque converter housing that is engaged with the flywheel. This action engages the transmission with the engine to substitute the indirect connection with a direct connection and thus increase gas mileage.

While this direct connection increases gas mileage, it also increases the probability of engine vibration and resonance passing from the engine to the transmission and drive train. To prevent vibration transfer, a slip clutch is used. Instead of a complete engagement of the torque converter with the engine, the clutch slips so as to rotate slightly slower (approximately 50 RPM) than the engine flywheel. However, this constant slippage increases the heat of friction which causes wear on the friction pads, pressure plate and the housing of the torque converter and also degrades the transmission fluid.

United States Patent Publication No. 2003/000790 to Ackermann provides grooves on the inner surface of the torque converter housing or alternatively, the pressure plate or friction pad. The grooves are designed to provide access of the friction pad to cooling oil in the torque converter. However, heated oil from the friction pad is mixed with cooler oil from the turbine and is often then returned to the friction pad thus reducing the heat removal capacity of the oil.

Therefore, there is a need for a device that allows for the operation of a slip clutch to reduce transmission of engine vibration while simultaneously improving the heat removal capacity of the oil flowing through the clutch assembly.

SUMMARY OF THE INVENTION

The present invention broadly comprises a torque converter clutch assembly including a pressure plate, a torque converter housing, a friction plate possessing a first side and a second side and positioned between the pressure plate and the torque converter housing, and at least one friction pad that also includes a plurality of connected grooves. The plurality of connected grooves includes at least one circumferential groove connected to a plurality of radial grooves. The present invention also includes at least one boat in operative connection with the at least one circumferential groove.

An object of the invention is to reduce the build up of heat in the friction plate caused by the slipping of the friction plate against the torque converter housing.

A second object of the invention is to reduce the rate of deterioration of friction pad.

A third object of the invention is to establish a flow of cooling oil within the torque converter that passes over the friction pad(s) and friction plate.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which.

DETAILED DESCRIPTION OF THE INVENTION

At the outset, it should be appreciated that like drawing numbers on different drawing views identify identical structural elements of the invention. While the present invention is described with respect to what is presently considered to be the preferred embodiments, it is understood that the invention is not limited to the disclosed embodiments. For example, while the description below describes two friction surfaces, the invention can be applied to any number of surfaces.

Figure 1:
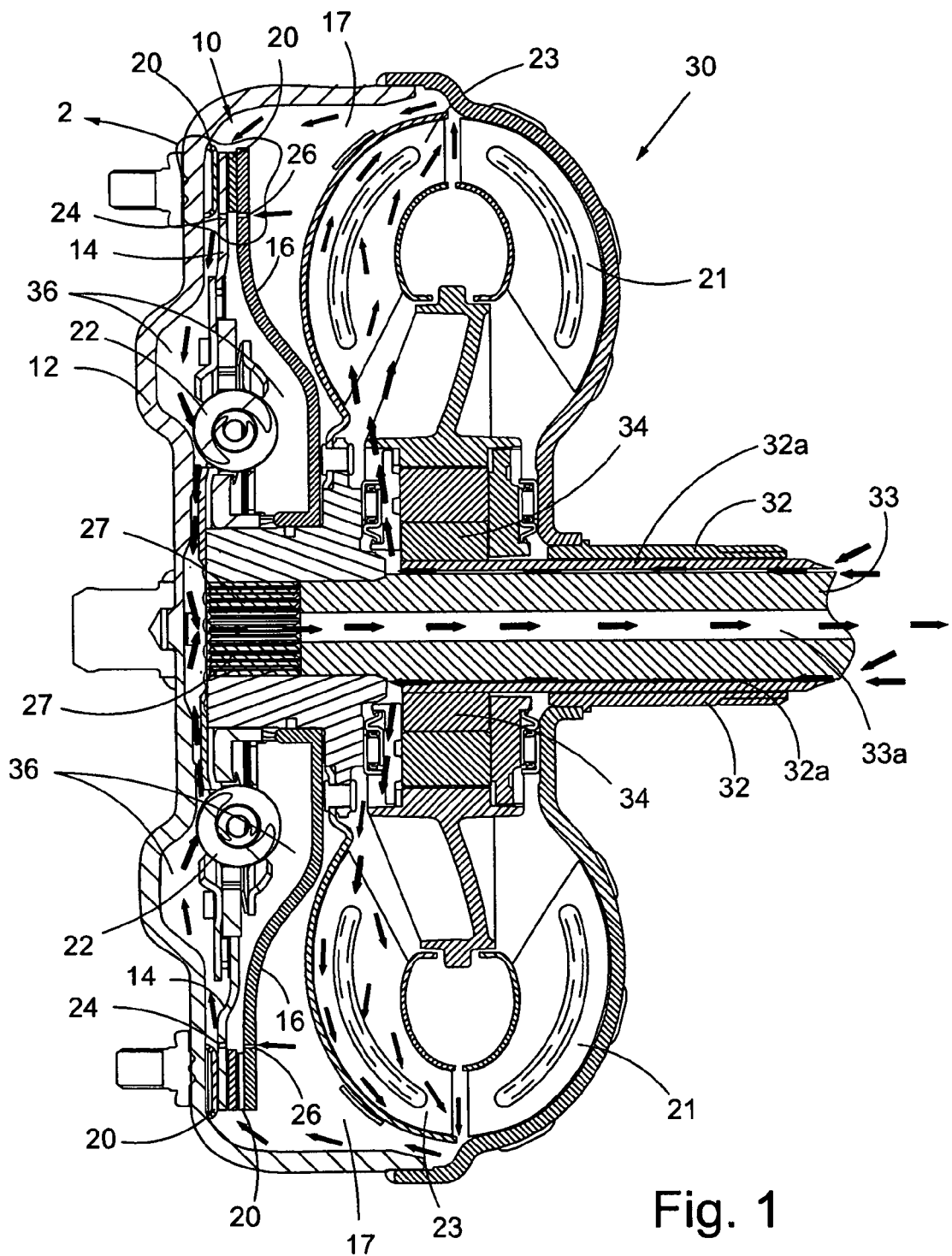
FIG. 1 is a cross section representation of the torque converter assembly of the present invention depicting flow of transmission oil.

Adverting to the drawings, FIG. 1 is a cross section representation of clutch assembly 10. Clutch 10 includes friction plate 14 positioned between pressure plate 16 and torque converter housing 12 ("housing 12"). Friction plate 14 is connected to damper 22 which reduces vibration conducted from the engine and drive shaft (not shown) to clutch assembly 10. Inlet channel 26 passes through pressure plate 16 and provides a pathway for cooling oil to pass from chamber 17 through pressure plate 16 to space 36. Space 36 is bound by pressure plate 16 and housing 12. As seen in FIG. 1, space 36 surrounds friction plate 14 and damper 22 and is contiguous with hollow space 33a in input shaft 33. Also seen are turbine 23, pump 21, and stator 34. Not seen in FIG. 1 is friction pad 18 positioned between friction plate 14 and housing 12.

Figure 2A:
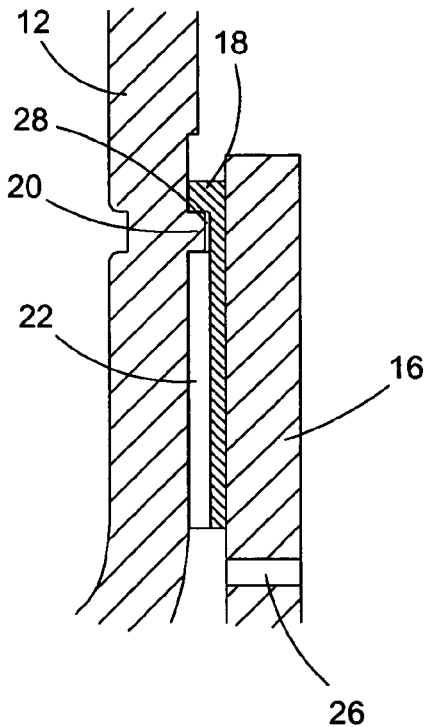
FIG. 2A depicts one embodiment of a magnified view of circled area 2 in FIG. 1.
Figure 2B:
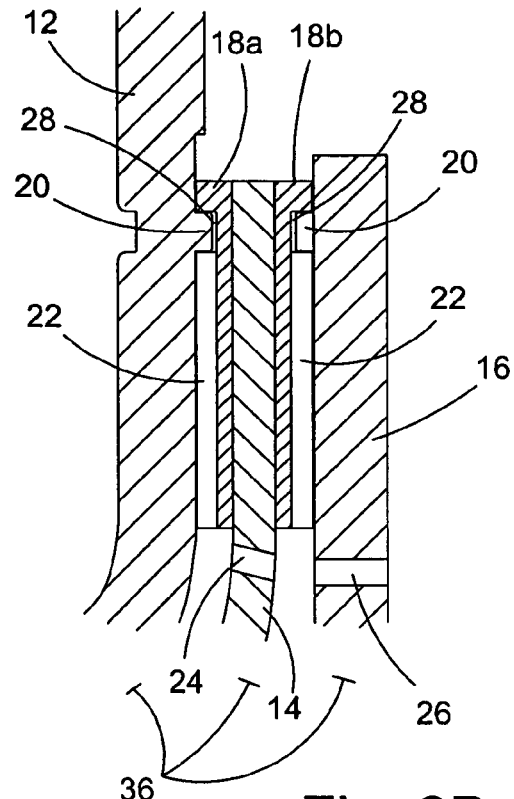
FIG. 2B depicts a second embodiment of a magnified view of circled area 2 in FIG. 1.
Figure 2C:
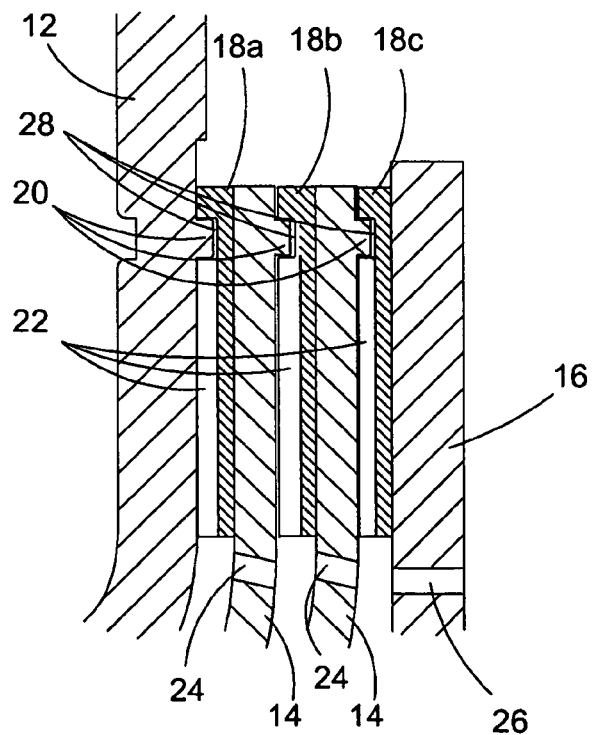
FIG. 2C depicts a third embodiment of a magnified view of circled area 2 in FIG. 1.

FIGS. 2A-C are magnified cross sections showing alternate embodiments of circled area 2 in FIG. 1. As described above, inlet channel 26 passes through pressure plate 16 to space 36. In FIG. 2A a single friction pad 18 is shown positioned between pressure plate 16 and housing 12. Boat 20 extends from housing 12 into circumferential groove 28 in friction pad 18. Radial groove 22 extends from circumferential groove 28 and leads into space 36. In FIG. 2B, channel 24 passes though friction plate 14. Friction pads 18 are positioned or attached on either side of friction plate 14 so as to be contacted on one side of friction plate 14 by pressure plate 16 and the other side by housing 12. In this cross sectional view, as in FIGS. 2A and 2C, circumferential grooves 28 extend around friction pads 18 somewhat below the outer perimeter 30 (seen in FIG. 3) of friction pads 18. Although in the embodiment shown, circumferential grooves 28 are seen on both friction pads 18, it will be recognized by those skilled in the art that circumferential grooves 28 may be located only on friction pad 18a or friction pad 18b. Radial grooves 22 extend from circumferential grooves 28 and lead into space 36 on one or both sides of friction plate 14. In FIG. 2C, channels 24 passes though a plurality of friction plates 14. Friction pads 18a, 18b, and 18c are positioned between friction plates 14. The outer friction pads 18a and 18c are contacted by housing 12 and pressure plate 16, respectively, in a fashion similar to FIGS. 2A and 2B. Although in the embodiment shown in FIG. 2C circumferential grooves 28 are seen on friction pads 18a-c, it will be recognized by those skilled in the art that circumferential grooves 28 may be located only on one of friction pads 18a-c or any combination of some or all of friction pads 18a-c. In addition, more than three friction pads 18a-c may be utilized in alternate embodiments of the invention. In all of FIGS. 2A-C, radial grooves 22 extend from circumferential grooves 28 and lead into space 36 on one or both sides of friction plate 14. In a preferred embodiment, a plurality of boats 20 will be fitted into each of circumferential grooves 28 between radial grooves 22.

Boats 20 are seen extending or fitting into circumferential grooves 28. In FIG. 2B, boat 20 extending from pressure plate 16 is shown as attached to pressure plate 16. Boat 20 may also be attached to housing 12. Attachment may be by welding, brazing, adhesives, rivets, and other attachment means well known to those skilled in the art. In an alternate embodiment, boat 20 extending from housing 12 and/or pressure plate 16 may be formed by a stamping or other forming method so as to be an integral part of the configuration of housing 12 or pressure plate 16. As seen in FIG. 2C, boat(s) 20 may also attached to or formed from friction plate(s) 14.

Figure 3:
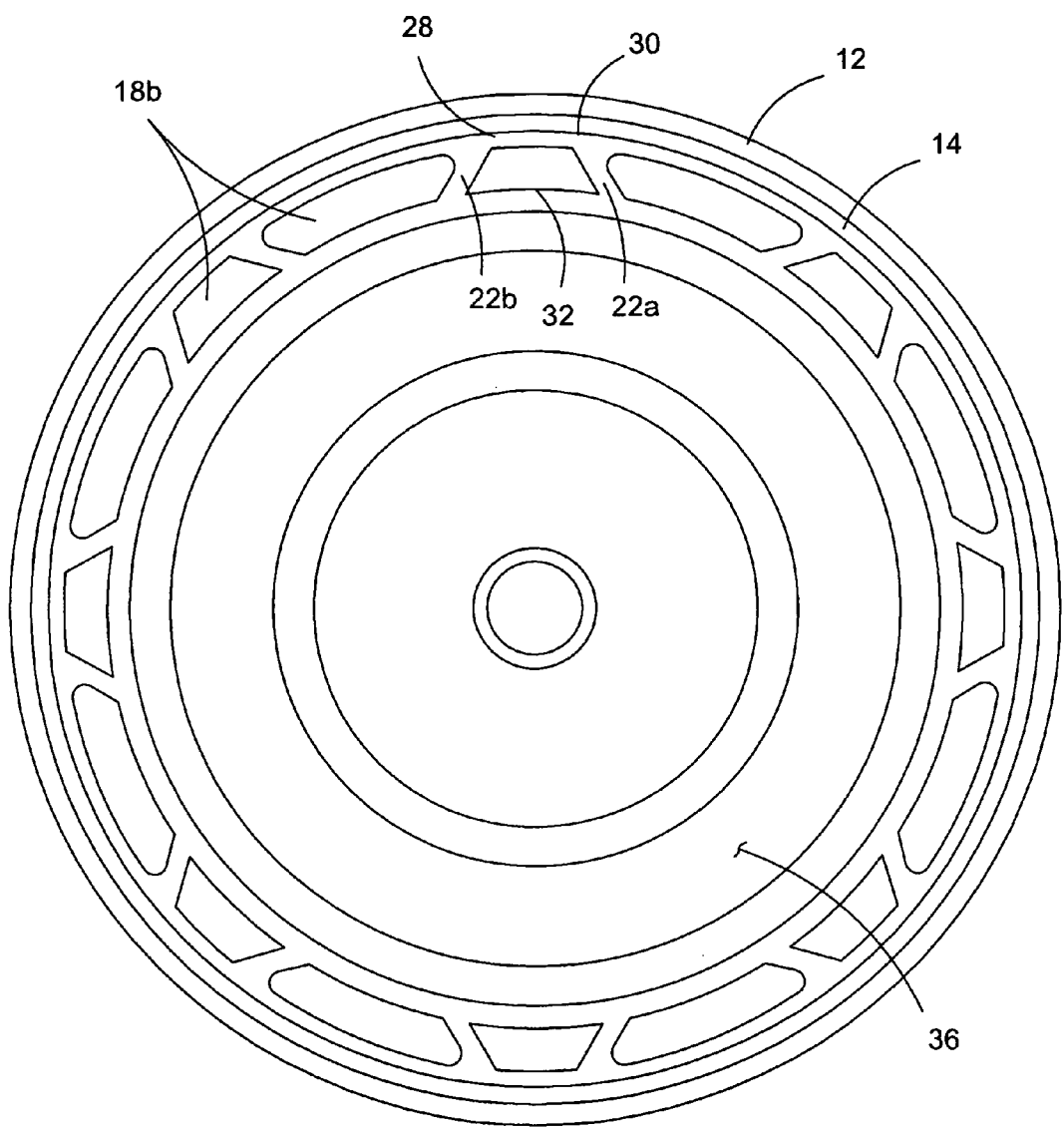
FIG. 3 is a front view of the friction pad with the pressure plate removed; and, FIG. 4 is a front view of the present invention in which the boat is fitted into the circumferential groove in the friction pad.

FIG. 3 is a front view of friction plate 14 with pressure plate 16 removed. Friction pad 18 is shown to include outer edge 30 and inner edge 32 and contains circumferential groove 28 and a plurality of radial grooves 22 that connect circumferential groove 28 with space 36 by opening into space 36 at inner edge 32. In a preferred embodiment, radial grooves 22 extend from circumferential groove 28 at approximately a 30° angle. The circumference of housing 12 is larger that that of friction plate 14 and forms a sealing—like connection with friction plate 14. Although not shown in FIG. 3, pressure plate 16 forms a similar sealing—like connection with friction plate 14.

Figure 4:
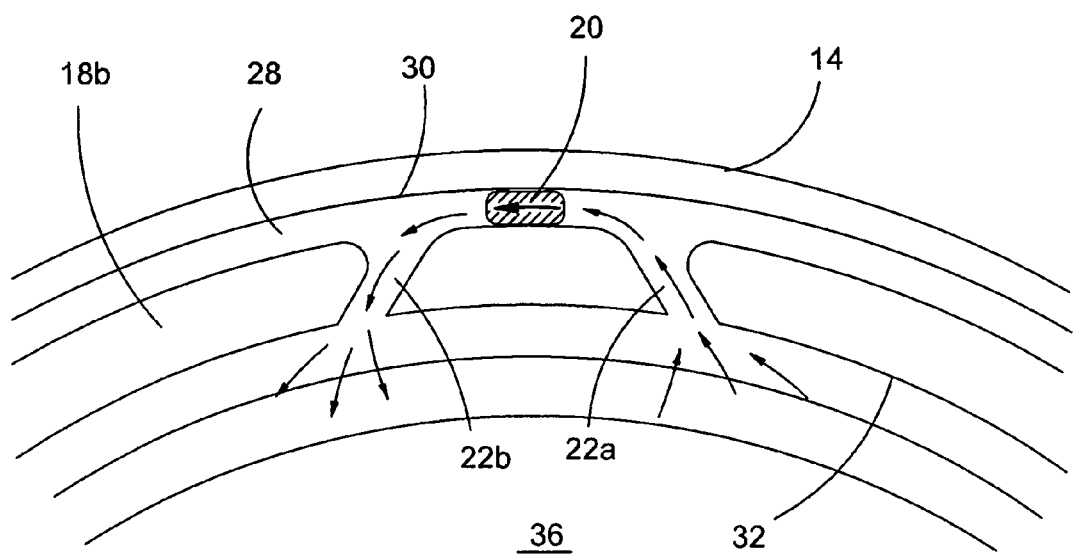

FIG. 4 is a front view showing boat 20 fitted into circumferential groove 28 of friction pad 14. As can be seen in FIG. 1, pump 21, pressure plate 16, and housing 12 are connected to the engine flywheel (not shown) and rotate with the engine (not shown). Transmission controls are electronic, so when certain operational parameters are attained, including, but not limited to, engine speed, vehicle speed, and throttle position, a solenoid is activated to allow the oil to enter chamber 17 and push pressure plate 16 against friction plate 14 which in turn engages housing 12. This engagement of clutch assembly 10 with the engine increases the efficiency of drive train performance by enabling shaft 33 to rotate with the crankshaft of the engine (not shown).

An actual locking engagement of clutch assembly 10 with the engine flywheel significantly increases the probability of the transfer of engine vibration to the transmission and shaft 33. Thus, clutch assembly 10 is preferably a slip clutch configured to turn somewhat slower (~50 RPMs) than the engine flywheel. As pressure plate 16 and housing 12 turn, boats 20 rotate within circumferential groove 28. At the same time, cooler oil flows into the clutch assembly 10 through inlet channel 26 and friction channel(s) 24 to surround friction plate 14 to include friction pads 18. The vacuum created in entrance radial groove 22a by the rotation of boat 20 past entrance radial groove 22a acts to force oil into circumferential groove 28. Simultaneously, the rotation forces oil within circumferential groove 28 that is ahead of boat 20 into an exit radial groove 22b immediately ahead of boat 20. During the time the oil is within circumferential groove 28, it absorbs heat created by the slipping action of clutch assembly 10 and removes the heat as it leaves circumferential groove 28 through exit radial groove 22b. From radial grooves 22, oil is directed from space 36 into hollow space 33a in shaft 33 and back into the transmission. By rotating boats 20 to create the directed oil flow, a flow of oil is created from turbine 23 to clutch 10 to space 36 and then to hollow space 33a with reduced return of heated oil back to circumferential groove 28 through a remixing of inflowing cooler oil and heated oil from friction pad(s) 14. Consequently, heat is more efficiently removed from friction pads 18 thereby reducing wear and transmission fluid degradation from the heat of friction generated by the pressure of pressure plate 16 and housing 12 against friction pads 18.

Thus it is seen that the objects of the invention are efficiently obtained, although changes and modifications to the invention should be readily apparent to those having ordinary skill in the art, which changes would not depart from the spirit and scope of the invention as claimed.

I claim:

1. A torque converter clutch assembly comprising;
   a pressure plate, said pressure plate defining an inlet channel;
   a torque converter housing;
   a friction pad having an outer edge and an inner edge and attached to said pressure plate, said friction pad including a plurality of connected grooves, wherein said plurality of connected grooves includes at least one circumferential groove connected to a plurality of entrance and exit radial grooves, said entrance and exit grooves opening onto said inner edge; and,
   at least one boat fitted within said at least one circumferential groove.

2. The torque converter clutch assembly as recited in claim 1 further comprising a friction plate positioned between said pressure plate and said torque converter housing, said friction plate having a first side and a second side and defining a channel between said first side and said second side, wherein at least one second friction pad having an outer edge and an inner edge is attached to said friction plate and includes a plurality of connected grooves, wherein said plurality of connected grooves includes at least one circumferential groove connected to a plurality of entrance and exit radial grooves, said entrance and exit grooves opening onto said inner edge of said friction plate.

3. The torque converter clutch assembly as recited in claim 2 wherein said at least one second friction pad is attached to said first side of said friction plate.

4. The torque converter clutch assembly as recited in claim 2 wherein said at least one second friction pad is attached to said second side of said friction plate.

5. The torque converter clutch assembly as recited in claim 2 wherein one of said at least one second friction pad is attached to each of said first side and said second side of said friction plate.

6. The torque converter clutch assembly as recited in claim 2 further comprising at least one second boat attached to said friction plate.

7. The torque converter clutch assembly as recited in claim 2 wherein said friction plate is configured to form at least one second boat.

8. The torque converter assembly as recited in claim 1 wherein said at least one boat is positioned between an entrance radial groove and an exit radial groove.

9. The torque converter clutch assembly as recited in claim 1 wherein said at least one boat is attached to said pressure plate.

10. The torque converter clutch assembly as recited in claim 1 wherein said pressure plate is configured to form said at least one boat.

11. The torque converter clutch assembly as recited in claim 1 wherein said at least one boat is attached to said torque converter housing.

12. The torque converter clutch assembly as recited in claim 1 wherein said torque converter housing is configured to form said at least one boat.

13. The torque converter clutch assembly as recited in claim 1 wherein said pressure plate and said torque converter housing are configured to form at least two of said at least one boats.

14. A torque converter clutch assembly comprising:
a pressure plate, said pressure plate defining an inlet channel;
a torque converter housing;
a friction plate having a first side and a second side and defining a channel between said first side and said second side, said friction plate positioned between said pressure plate and said torque converter housing;
a pair of friction pads, one of said pair of friction pads attached to said first side of said friction plate and the second of said pair of friction pads attached to said second side of said friction plate, each of said pair of friction pads having an inner edge and an outer edge and including a plurality of connected grooves, wherein said plurality of connected grooves includes at least one circumferential groove connected to a plurality of entrance and exit radial grooves, said entrance and exit grooves opening onto said inner edge; and,
at least one boat fitted within each of said at least one circumferential groove.

15. The torque converter assembly as recited in claim 14 wherein each of said at least one boat is positioned between an entrance radial groove and an exit radial groove.

16. The torque converter clutch assembly as recited in claim 14 wherein at least one of said at least one boat is attached to said to said pressure plate.

17. The torque converter clutch assembly as recited in claim 14 wherein said pressure plate is configured to form at least one of said at least one boat.

18. The torque converter clutch assembly as recited in claim 14 wherein at least one of said at least one boat is attached to said to said torque converter housing.

19. The torque converter clutch assembly as recited in claim 14 wherein said torque converter housing is configured to form at least one of said at least one boat.

20. The torque converter clutch assembly as recited in claim 14 wherein said pressure plate and said torque converter housing are each configured to form at least two of said at least one boats.

21. The torque converter clutch assembly as recited in claim 14 wherein at least one of said at least one boat is attached to said friction plate.

22. The torque converter clutch assembly as recited in claim 14 wherein said friction plate is configured to form at least one of said at least one boat.

23. The torque converter clutch assembly as recited in claim 14 wherein said at least one boat is a plurality of boats.

24. A torque converter clutch assembly comprising;
a pressure plate, said pressure plate defining an inlet channel;
a torque converter housing;
a plurality of friction plates each having a first side and a second side and defining a channel between said first side and said second side, said plurality of friction plates positioned between said pressure plate and said torque converter housing;
a plurality of friction pads, one of said plurality of friction pads attached to one or both of said first sides and said second sides of said plurality of friction plates, each of said plurality of friction pads having an inner edge and an outer edge and including a plurality of connected grooves, wherein said plurality of connected grooves includes at least one circumferential groove connected to a plurality of entrance and exit radial grooves, said entrance and exit grooves opening onto said inner edge; and,
at least one boat fitted within each of said at least one circumferential groove.

25. The torque converter assembly as recited in claim 24 wherein each of said at least one boat is positioned between an entrance radial groove and an exit radial groove.

26. The torque converter clutch assembly as recited in claim 24 wherein at least one of said at least one boat is attached to said to said pressure plate.

27. The torque converter clutch assembly as recited in claim 24 wherein said pressure plate is configured to form at least one of said at least one boat.

28. The torque converter clutch assembly as recited in claim 24 wherein at least one of said at least one boat is attached to said to said torque converter housing.

29. The torque converter clutch assembly as recited in claim 24 wherein said torque converter housing is configured to form at least one of said at least one boat.

30. The torque converter clutch assembly as recited in claim 24 wherein said pressure plate and said torque converter housing are each configured to form at least two of said plurality of boats.

31. The torque converter clutch assembly as recited in claim 24 wherein at least one of said at least one boat is attached to at least one of said plurality of friction plate.

32. The torque converter clutch assembly as recited in claim 24 wherein at least one of said plurality of friction plates is configured to form at least one of said at least one boat.

33. The torque converter clutch assembly as recited in claim 24 wherein said at least one boat is a plurality of boats.

* * * * *